United States Patent [19]
Reichman, Jr.

[11] 4,449,842
[45] May 22, 1984

[54] SLEEVE BRACKET

[75] Inventor: William Reichman, Jr., Greentown, Pa.

[73] Assignee: Custom Wrought Products, Co., Greentown, Pa.

[21] Appl. No.: 313,604

[22] Filed: Oct. 21, 1981

[51] Int. Cl.³ .............................................. F16D 1/00
[52] U.S. Cl. ...................................... 403/25; 403/217; 182/185
[58] Field of Search ................... 403/217, 391, 24, 25; 182/185, 181; 211/60 R

[56] References Cited

U.S. PATENT DOCUMENTS

| | | | |
|---|---|---|---|
| 2,037,736 | 4/1936 | Payne et al. | 403/406 |
| 2,879,087 | 3/1959 | Haglund | 403/391 X |
| 2,931,129 | 4/1960 | Boniface | 403/176 X |
| 3,740,084 | 6/1973 | Tellberg | 403/171 |
| 4,076,431 | 2/1978 | Burvall | 403/231 X |

FOREIGN PATENT DOCUMENTS 189039  4/1964  Sweden ............................... 403/217

*Primary Examiner*—Andrew V. Kundrat
*Attorney, Agent, or Firm*—Karl L. Spivak

[57] ABSTRACT

The sleeve bracket includes three attached sleeves, each sleeve having open ends for receiving and connecting similar frame members. Each sleeve is oriented in a direction which is perpendicular to the other two. The sleeves of the sleeve bracket intersect at right angles and define continuous unobstructed conduits to allow a frame member to be affixed within a sleeve at any point along the length of the frame member. Depending upon the positioning of frame members within the three sleeves, and the orientation and number of sleeve brackets employed, a number of sturdy, easily assembled, simply designed structures can be erected.

11 Claims, 7 Drawing Figures

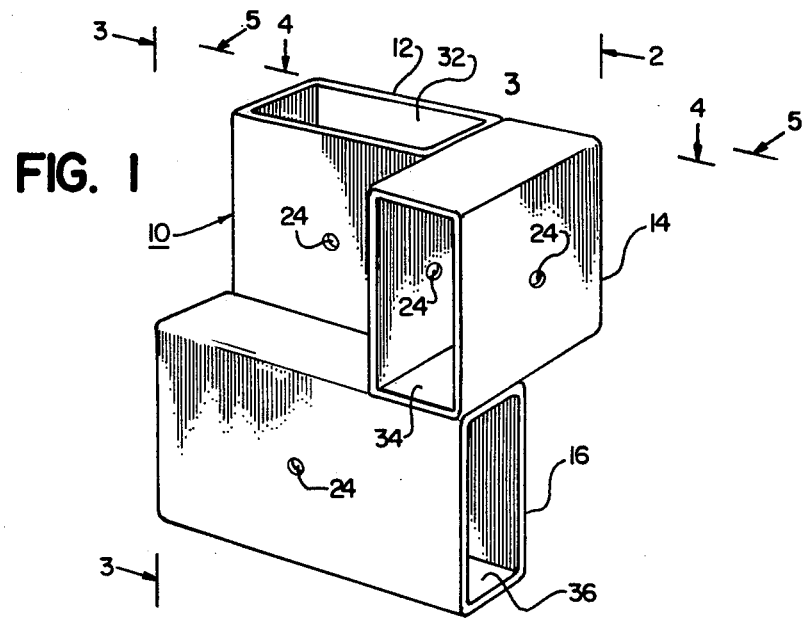
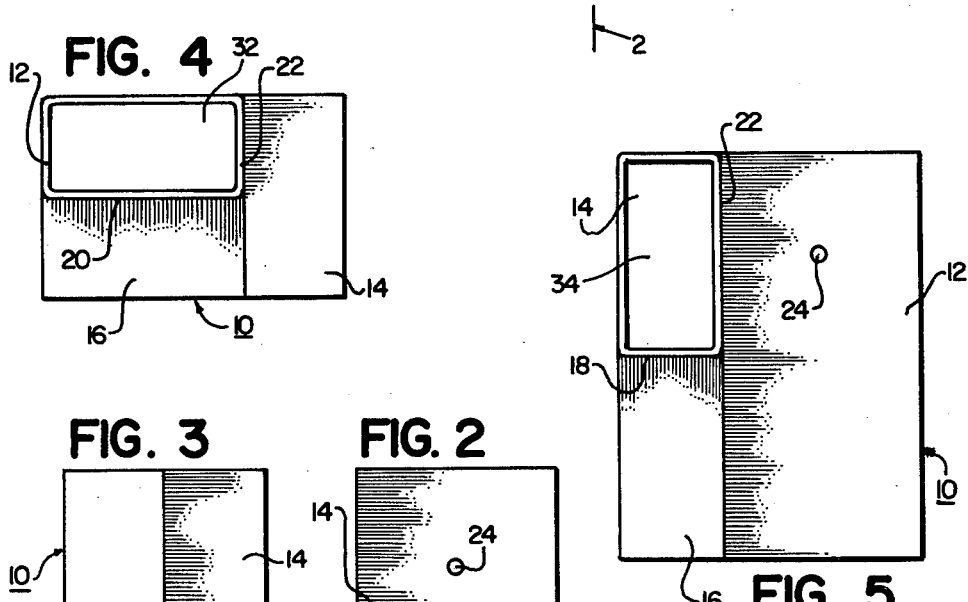
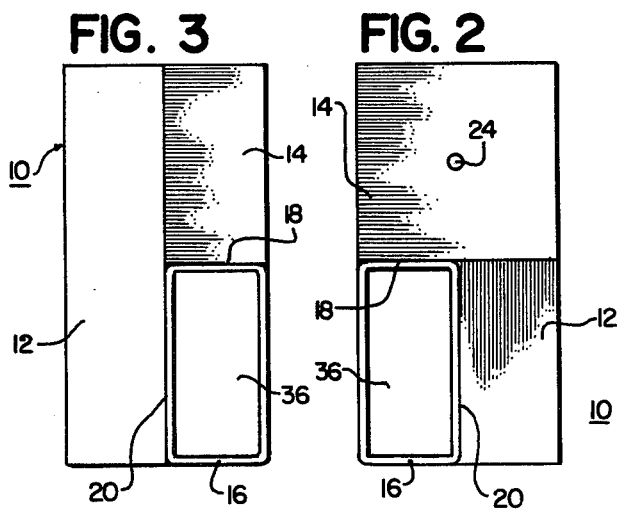

SLEEVE BRACKET

BACKGROUND OF THE INVENTION

This invention relates generally to connecting brackets for assembling frame members and more particularly, relates to brackets for positioning two or more frame members perpendicular to each other.

Brackets for angularly interconnecting elongate construction members are known and have been widely employed by prior workers in the art. The configurations of the prior art brackets vary widely, depending upon their intended use. For example, U.S. Pat. No. 4,076,431, issued to Burvall teaches a connecting element consisting of two sleeves which are oriented at one hundred and twenty degrees to each other in the same plane, and a third sleeve which is open at both ends and which passes through the juncture of the first two sleeves at ninety degrees to the plane that they define. The one hundred and twenty degrees angle between two of the sleeves facilitates the construction of a A-shaped roof structure. U.S. Pat. Nos. 2,931,129 and 3,740,084 disclose other bracket configurations which are suitable for angularly interconnecting elongate construction elements.

However, the three cited patents do not suggest and do not anticipate a three sleeve connecting bracket which can permit a frame member to pass through each sleeve whereby each of three frame members could extend completely through a sleeve. While not heretofore shown in a three sleeve bracket, the concept is embodied in a two sleeve bracket in U.S. Pat. No. 1,848,085 issued to Eisenschmidt. The Eisenschmidt design contempletes the angular securing together of two frame members in a manner which permits them to intersect without one of them having to be physically affixed to the other.

In all prior art designs for three-directional sleeve brackets of which I am aware, none include a third sleeve that does not intersect one of the first two. For example, in the jointed structure illustrated in U.S. Pat. No. 2,037,736, there is disclosed a bracket that permits assembly of three structural members to form a right angle corner, but one structural member is always prevented from extending through the bracket by the intersection of one of the other structural members.

Applicant has solved the previously existing difficulty by adding a third sleeve to two non-intersecting sleeves, which third sleeve is itself non-intersecting of the other two.

SUMMARY OF THE INVENTION

The present invention relates generally to bracket constructions, and more particularly, is directed to a novel three sleeve bracket wherein each sleeve is offset through ninety degrees from another sleeve and wherein all of the sleeves are endwardly open.

The sleeve bracket comprises a plurality of three non-intersecting sleeves for connecting frame members in three dimesional, right angle orientation. Each sleeve is affixed to and is perpendicular with the other two sleeves. All of the angularly interconnected sleeves are endwardly open at both ends to receive therein separate elongated frame members for fabrication of a three dimensional structure. The elongated frame members are secured by the brackets in three-diminsional, right-angle orientation to form a structure of desired configuration. The frame members respectively enter one or both ends of each sleeve and are secured therein to provide an easily assembled inexpensive and sturdy three-dimensional structure.

The sleeve bracket of the present invention may be used to easily create simple structures such as log holders or saw bucks, or may be employed for more elaborate construction purposes. Preferably, each sleeve is provided with at least one hole through one of the walls which define the sleeve so that a nail or screw may be driven to affix the frame member in position after it been inserted within the sleeve. In this manner an extremely sturdy and uncomplicated structure of three dimensional configuration can be developed.

It is therefore an object of the present invention to provide an improved sleeve bracket of the type set forth.

It is another object of the present invention to provide a novel sleeve bracket which permits the connection and intersection of three frame members at any point along their lengths or at their ends.

It is another object of the present invention to provide a novel sleeve bracket including a plurality of angularly interconnected sleeves for securing a plurality of frame members in perpendicular orientation whereby one frame member extends in a direction perpendicular to the direction of each of the other frame members.

It is another object of the present invention to provide a novel three-directional sleeve bracket that is inexpensive to manufacture, easy to assemble and trouble free when in use.

Other objects and a better understanding of the invention will be had by referring to the following description and claims of a preferred embodiment, taken in conjunction with the accompanying drawings wherein like reference characters refer to similar parts throughout the several views, and in which:

BRIEF DESCRIPTION OF THE DRAWINGS

FIG. 1 is a perspective view of a sleeve bracket constructed in accordance with the present invention.

FIG. 2 is a side elevational view looking from line 2—2 on FIG. 1 in the direction of the arrows.

FIG. 3 is a side elevational view looking from line 3—3 on FIG. 1 in the direction of the arrows.

FIG. 4 is a top plan view looking from line 4—4 on FIG. 1 in the direction of the arrows.

FIG. 5 is a rear elevational view looking from line 5—5 on FIG. 1 in the direction of the arrows.

DESCRIPTION OF THE PREFERRED EMBODIMENT OF THE INVENTION

Figure 6:
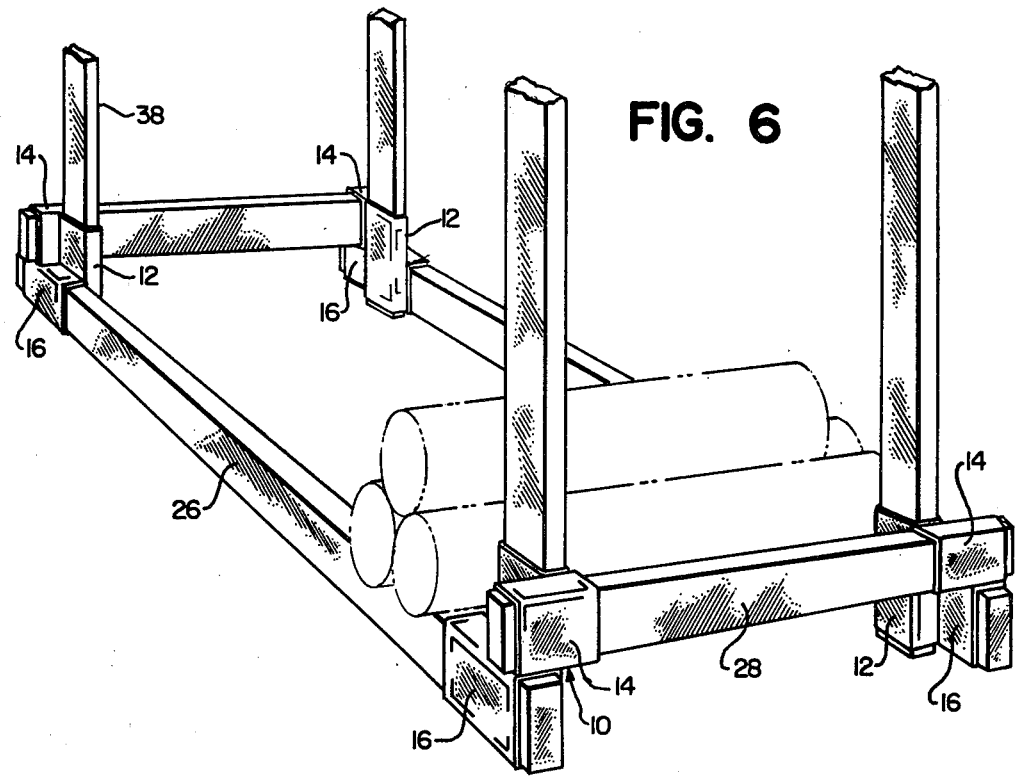
FIG. 6 is a perspective view of a log rack constructed by interconnecting four sleeve brackets of the present invention.

Although specific terms are used in the following description for the sake of clarity, these terms intended to refer only to the particular structure of the invention selected for illustration in the drawings and are not intended to define or limit the scope of the invention.

In FIG. 1 there is illustrated a sleeve bracket 10 comprising three attached sleeves 12, 14, 16. The sleeves are fabricated of a strong material, such as steel and are secured in angularly intersecting relationship in known manner, for example, by welding. The sleeves 12, 14, 16 are all formed to the same cross sectional configuration and preferably are designed of suitable rectangular dimensions to receive therein a conventional, popular size frame member, such as 2 by 4 lumber.

In the embodiment of the invention illustrated, the sleeves 12, 14, 16 are all of rectangular cross-section, but it is contemplated that other cross sectional configurations could also be employed.

The sleeves 12, 14, 16 may be fabricated of bent steel, metal pipe, extruded, durable plastic or any other suitable, strong material. Assuming that each sleeve receives a frame member of essentially the same cross-sectional shape, all three sleeves will be of identical height and width throughout their lengths. The length of each sleeve, can be adjusted to attain the optimum surface area of contact with the contained frame member. In a preferred embodiment, the height of each sleeve 12, 14, 16 will be equal to twice the width of the sleeve. As illustrated, the length of the sleeve 14 should be equal to its height, the length of the sleeve 16 should equal the sum of its height and width, and the length of the sleeve 12 should be equal to twice its height. If these particular dimensions are selected, and the sleeves are welded or otherwise secured together at ninety degree offset orientation, the sleeve bracket 10 could appear as illustrated in FIGS. 1-5.

Referring now to FIGS. 2-5, it will be observed that the sleeves 12, 14, 16, are positioned in right angle orientation with each other, that is, each sleeve extends at right angles to every other sleeve. In the illustrated embodiment, the sleeves 14, 16 have their respective longitudinal axes in horizontal alignment and the sleeve 12 is oriented with its longitudinal axis in vertical alignment. Each sleeve comprises a peripheral shell which preferably closes upon itself to define a respective hollow, longitudinally extending, interior channel or space 32, 34, 36. As hereinafter more fully set forth, the interior channels 32, 34, 36 receive frame members therewithin to form an easily assembled, extremely sturdy, useful article, such as a sawbuck or a log holder.

In FIG. 2, there is illustrated one side of the sleeve bracket 10 which will arbitrarily be designated as the front for purposes of description. The upper horizontal sleeve 14 is affixed to the lower horizontal sleeve 16 along one common edge 18 in a sturdy, known manner, such as by welding. The lower horizontal sleeve 16 can also be affixed to the rearward vertical sleeve 12 along the common vertical edge 20. The joined edges 18, 20 between the respective sleeves 14, 16 and 12, 16 are also visible in FIG. 3. As viewed in FIG. 4, it will be observed that the vertically oriented sleeve 12 is secured to the upper horizontal sleeve 14 along the common surface of intersection 22 and to the lower horizontal sleeve 16 at the common surface of intersection 20.

Referring again to FIGS. 2-5, it will be observed that the sleeves 12, 14, 16 comprising the sleeve bracket 10 are fabricated to respective lengths and are so oriented relative to one another as to define a rectangular outline in plan view (FIG. 4), a rectangular outline in side elevational view (FIG. 5) and a rectangular outline in front and rear elevational view (FIGS. 2 and 3). In this manner, a compact, strong and widely adaptable sleeve bracket can be fabricated.

Preferably, frame member securing holes 24 are provided in the respective sides of the sleeves 12, 14, 16 to permit a nail or screw (not shown) to be applied therethrough to secure a frame member to the bracket 10 after it has been properly positioned in one of the interior channels 32, 34, 36 defined within a sleeve 12, 14, 16. By so applying a nail or screw, it is possible to secure the frame member within the sleeve to prevent sliding or other relative movement between the parts after the sleeve bracket has been placed in use. As illustrated in FIG. 1, at sleeve 14, it is possible to provide two openings 24 in aligned orientation in opposite sides of a sleeve to permit a nail, pin, or screw or other fastening member to pass completely through a sleeve if so desired. Additionally, it will be appreciated that it would readily be possible to provide more than one opening 24 in a side to thereby receive a plurality of fasteners.

The sleeves 12, 14, 16 may be attached to each other by welding, brazing, riveting, with a suitable adhesive, or by any other known method which will not impede the placement of a frame member into the interior of the sleeve.

Referring now to FIG. 6, there is illustrated a construction comprising four sleeve brackets 10, four horizontal frame members 26, 28, and four vertical frame members 38. The parts are assembled so that each bracket 10 defines a three dimensional corner, which corner forms a portion of a rectangular construction, in this case, a log holder. To form the illustrated rectangular structure, care must be taken to align the brackets so that each long, horizontal frame member 26 is positioned with its ends placed into corresponding lower horizontal sleeves 16 of spaced brackets 10. Similarly, the shorter horizontal frame members 28 have their ends secured within the upper horizontal sleeves 14 of a pair of spaced sleeve brackets 10. The vertical frame members 38 each have one end seated within a vertically oriented sleeve 12.

Figure 7:
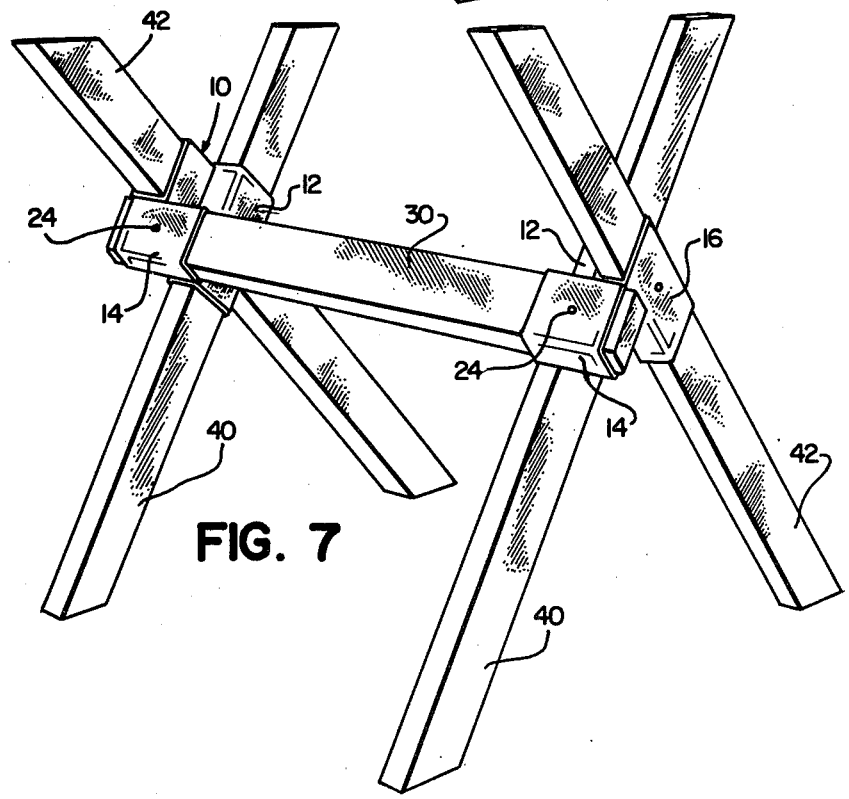
FIG. 7 is a perspective view of a saw buck which is constructed by utilizing a pair of sleeve brackets of the present invention.

In the saw horse configuration of FIG. 7, the sleeve brackets 10 are angularly inclined. A horizontally oriented frame member 30 has its ends secured within the sleeves 14 to space apart the sleeve brackets 10. Pairs of left and right legs 40, 42 are respectively positioned through the corresponding sleeves 12, 16 to form cross-shaped end supports. It is noteworthy that the framing members 40, 42 extend through each end of the sleeves 12, 16 and can be secured therein in any desired longitudinally adjusted position by employing a securing fastener through the sleeve holes 24.

While only two constructions employing a plurality of sleeve brackets and frame members have been illustrated, it will be appreciated that numerous other structural shapes and configurations can be developed by employing the teachings of the present invention.

Although the present invention has been described with reference to the particular embodiments herein set forth, it is understood that the present disclosure has been made only by way of example and that numerous changes in the details of construction may be resorted to without departing from the spirit and scope of the invention. Thus the scope of the invention should not be limited by the foregoing specification, but rather only by the scope of the claims appended hereto.

What is claimed is:

1. A structure comprising four sleeve brackets in spaced relationship,
   each sleeve bracket comprising three sleeves, each sleeve being in angularly offset relationship to each other sleeve, each sleeve defining a hollow, rectangular interior channel,
   each sleeve being positioned in perpendicular relationship to the other two sleeves, and a plurality of rectangular frame members respectively inserted into the rectangular interior channels of the sleeves,
- one said frame member extending horizontally between each pair of spaced sleeve brackets,
- the sleeve brackets being positioned to define a structure of rectangular configuration, and
- one said frame member extending vertically upwardly from each sleeve bracket.

2. The structure of claim 1 wherein the frame members each include an elongated rectangular body defined between first and second ends, each frame member having its first end secured within a sleeve with the second end projecting outwardly of the sleeve.

3. The structure of claim 2 wherein one said horizontal frame member extends at right angles to another said horizontal frame member at each sleeve bracket.

4. The structure of claim 3 wherein each of the plurality of horizontal frame members has its second end secured within one of the said sleeves and wherein the second ends of the vertical frame members are not secured within a sleeve.

5. A structure comprising at least a pair of sleeve brackets in spaced relationship,
- each sleeve bracket comprising at least three sleeves, each sleeve being in angularly offset relationship, to each other sleeve, each sleeve defining a hollow interior channel,
- each sleeve being positioned in perpendicular relationship to the other two sleeves; and a plurality of frame members respectively inserted into the interior channels of the sleeves,
- at least one said frame member extending horizontally between a pair of spaced sleeve brackets and the other of said frame member being oriented in angular relationship to both a horizontal plane and a vertical plane.

6. The structure of claim 5 wherein the frame members include an elongate body defined between first and second ends, at least one of the frame members having its body secured within first a sleeve with both the first and second ends projecting outwardly of the first sleeve.

7. The structure of claim 6 wherein at least a second of said frame members has its body secured within a second sleeve with both the first and second ends projecting outwardly of the second sleeve.

8. The structure of claim 5 wherein at least one frame member extends horizontally between the sleeve brackets.

9. The structure of claim 8 wherein at least one said horizontal frame member extends at right angles to another said horizontal frame member.

10. The structure of claim 8 wherein a second group of the frame members extend vertically from the sleeve brackets.

11. The structure of claim 8 wherein each of the plurality of frame members has one said end secured within one of the said sleeves.

* * * * *